Jan. 4, 1938.   E. D. DALL   2,104,639
DOOR LOCKING AND WINDOW OPERATING DEVICE FOR AUTOMOBILES AND THE LIKE
Original Filed Feb. 4, 1933   7 Sheets-Sheet 1

Inventor
Edward D. Dall
Fay Oberlin & Fay
Attorneys

Jan. 4, 1938. E. D. DALL 2,104,639
DOOR LOCKING AND WINDOW OPERATING DEVICE FOR AUTOMOBILES AND THE LIKE
Original Filed Feb. 4, 1933   7 Sheets-Sheet 2

Inventor
Edward D. Dall
Fay Oberlin & Fay
Attorneys

Jan. 4, 1938.  E. D. DALL  2,104,639
DOOR LOCKING AND WINDOW OPERATING DEVICE FOR AUTOMOBILES AND THE LIKE
Original Filed Feb. 4, 1933   7 Sheets-Sheet 5

Inventor
Edward D. Dall
Fay Oberlin & Fay
Attorney

Jan. 4, 1938.     E. D. DALL     2,104,639
DOOR LOCKING AND WINDOW OPERATING DEVICE FOR AUTOMOBILES AND THE LIKE
Original Filed Feb. 4, 1933     7 Sheets-Sheet 6

Inventor
Edward D. Dall
Fay Oberlin & Fay
Attorneys

Jan. 4, 1938. E. D. DALL 2,104,639
DOOR LOCKING AND WINDOW OPERATING DEVICE FOR AUTOMOBILES AND THE LIKE
Original Filed Feb. 4, 1933 7 Sheets-Sheet 7

Inventor
Edward D. Dall
Fay Oberlin + Fay
Attorneys

Patented Jan. 4, 1938

2,104,639

UNITED STATES PATENT OFFICE 2,104,639

DOOR LOCKING AND WINDOW OPERATING DEVICE FOR AUTOMOBILES AND THE LIKE

Edward D. Dall, Cleveland, Ohio, assignor to Walter F. Wright, Shaker Heights, Ohio Original application February 4, 1933, Serial No. 655,180. Divided and this application May 5, 1934, Serial No. 724,161

30 Claims. (Cl. 268—26)

My present invention is a door-locking and window closing device for use with automobiles and elsewhere whereever useful.

One object of the invention is to lock all of the doors automatically from the locking of a master-door.

Another object is to accomplish said locking either from the outside of the car or from within. If from within, another object is to permit the occupant to open any door, leave the car and shut the door without locking the party out of the car by so doing.

For a modification, another object is to lock a plurality of the doors from a suitably located single control, which does not simultaneously lock the master-door, the bolt means of the latter being dogged or locked independently from the outside of the car.

Another object is to close the windows in the doors automatically from the locking of the doors.

Another object is to prevent the closed windows of the door-locked car from being forcibly opened from the outside.

Another object is to permit, in connection with the foregoing, the individual opening and closing of the windows in the regular way by hand from within the car after the master and other doors have been unlocked.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of my invention, it being expressly understood, however, that various changes may be made in practice within the scope of the claims without digressing from my inventive idea.

Referring now to the drawings:—

A and B are the doors on the right side of the automobile, A being the master door, so called because by locking A, all the other doors are automatically locked. a and b are the windows in said doors respectively. E is the center post of the automobile body on the master door side of the car between the free edges of said doors A and B, which are supposed to be hinged as usual at their edges furthest away from the center post.

In the same way C and D are the doors on the left or the driver's side of the car, c and d being the windows thereof respectively; and F is the center post between the free edges of said doors.

Figure 3:
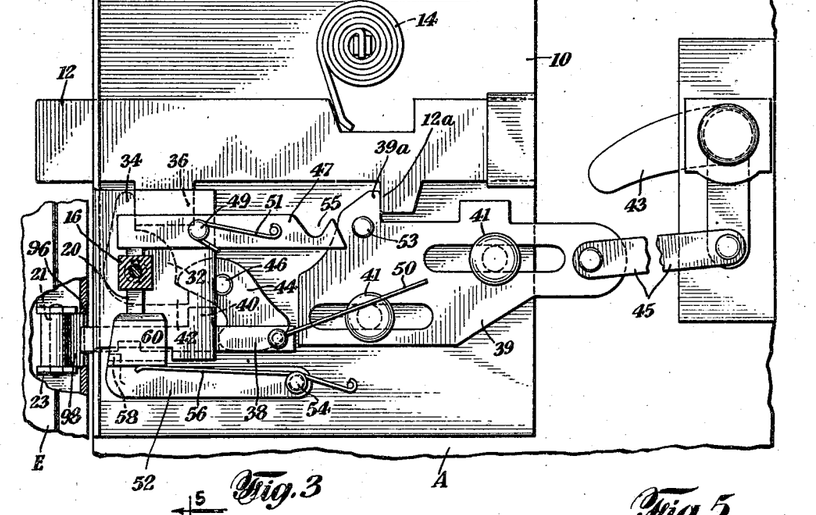
Fig. 3 is an enlarged view of the bolt means, retracting means and the dogging means of the master-door and adjacent parts, shown unlocked.
Figure 4:
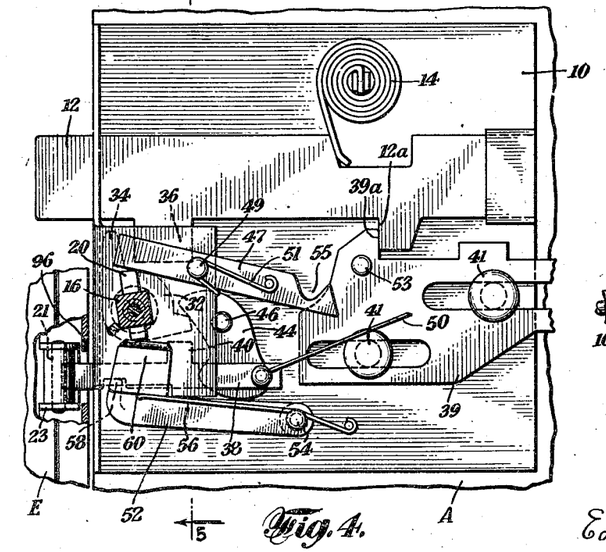
Fig. 4 is the same when locked.
Figure 5:
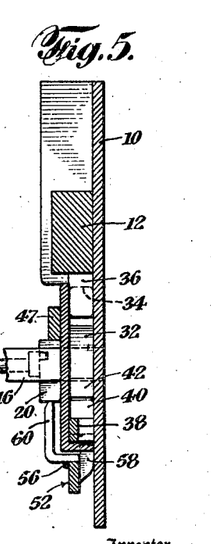
Fig. 5 is a vertical sectional view on the line 5—5 in Fig. 4.
Figure 19:
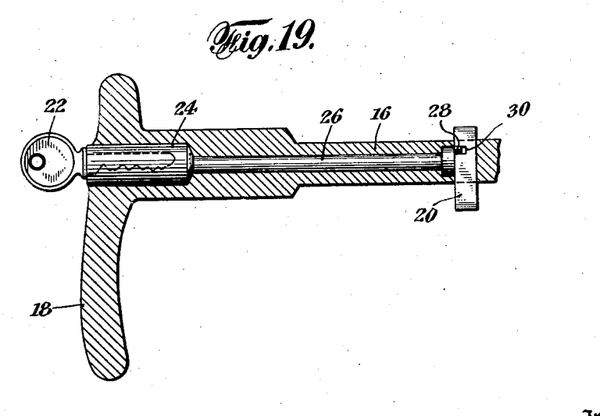
Fig. 19 is a side elevation of a master-door handle and combined key-operated means useable in connection with the devices of this invention.

Describing first the locking means for the master door A, see particularly Figs. 1 and 3, 4 and 5. 10 is a plate on the door for supporting the parts. 12 is the usual bolt pressed by the spring 14 into projecting position to enter the usual socket in the post E. 16 is the usual suitably supported shaft of the handle 18 shown in detail in Fig. 19. 20 is the usual vertically slidable dog operative in a transverse slot in the handle shaft, adapted to be shifted by a key-controlled means carried by the outside handle and shaft, between the "down" position of said dog in Fig. 3 and its "up" position in Fig. 4. Sufficient details of this are shown in Fig. 19 disclosing outside door handle 18, its shaft 16, key 22, barrel 24 rotatable by said key, rotatable shaft 26 which is a continuation of said barrel and has at its free end an eccentric pin 28 received in a groove 30 in the dog, which latter is thereby operable as stated between the aforesaid two positions (Figs. 3 and 4) by the rotation of the key-controlled barrel.

32 is a so-called roll-back secured to the handle shaft and having an upper projection 34 in front of a lug 36 on the bolt, for retracting the bolt by rotating the outside handle and shaft 16. 38 is a slide operatively supported for horizontal reciprocation below the roll-back. This slide has an upwardly extending projection 40. The roll-back has a lateral projection 42 which is clear of said projection 40 on the slide when positioned as in Fig. 3, but is in line with it when the slide is positioned as in Fig. 4. A tilting cam 44 is pivoted to the plate at 46 with its nose engaged by said lateral projection 42 on the roll-back and with its lower front corner at the end of the slide 38. The result is that turning the handle, its shaft 16 and the roll-back 32 in anticlockwise direction as in Fig. 4, operates the cam 44 to project the slide 38 to its maximum extent beyond the free edge of the door as compared with its normal position in Fig. 3. Spring means 48 (Fig. 1) pulls on the wire 50 attached to the forked inner end of the slide 38. This spring means duplicated on all the doors is later described in detail in connection with Figs. 1, etc. and Fig. 17; and said spring means on the master-door constantly tends to retract the slide 38 into its inner position as in Fig. 3. The projection 40 of the slide being now under the lateral projection 42 of the roll-back, the handle and handle shaft 16 cannot be turned clockwise sufficiently to retract the bolt 12.

52 is a latch pivoted to the plate at 54 and is pressed by the spring 56 upwardly under the slide. 58 is a projection at the free end of the latch receivable into a notch on the under side of the slide. Finally, 60 is an upward extension on the free end of the latch at the side of the slide in line with and engageable by the lower end of the previously described key operated dog 20 in the handle shaft. When this dog is in its position Fig. 4, it will be noted that the latch 52 is in locking engagement with the slide 38 preventing its retraction by the referred to spring means 48 (Fig. 1) pulling on the rod 50.

Summarizing the operation of the master-door lock, Fig. 3 shows the unlocked condition and Fig. 4 the locked condition. Locking the master-door, in other words, dogging its bolt retracting means to prevent the retraction of the bolt by the outside handle, is accomplished as follows:

The key 22 (Fig. 19) being turned in the master-door handle into locked position shifts the dog 20 into upper position (Fig. 4) thereby rendering the latch 52 operative. The door handle 18 (Fig. 19) and shaft 16 (Fig. 3) are then rotated anti-clockwise from the position in Fig. 3 to the position in Fig. 4, and through the roll-back 32 and cam 44 force the slide 38 to the left against the pull of the spring means on the rod 50 into abutting position under the roll-back as in Fig. 4, wherein it is latched by the latch 52. The bolt retracting means is now dogged and the master-door handle cannot be turned to retract the bolt 12. Moreover the slide 38 cannot be tampered with and forced back because it is latched. Thus, the bolt retracting means has been dogged by the counterclockwise turning of the door handle and also by the key means, the latter being necessary to latch and hold the dogging means in its operating position.

To unlock the master-door; the key is inserted in the door handle and turned to unlocking position (Fig. 3). This lowers the dog 20 as in Fig. 3, releases the latch 52 from the slide 38 which is then automatically retracted by the spring means pulling on the rod 50 and thereby un-dogs the roll back 32, permitting the handle and shaft 16 to be turned clockwise to retract the bolt and open the door.

Figure 1:
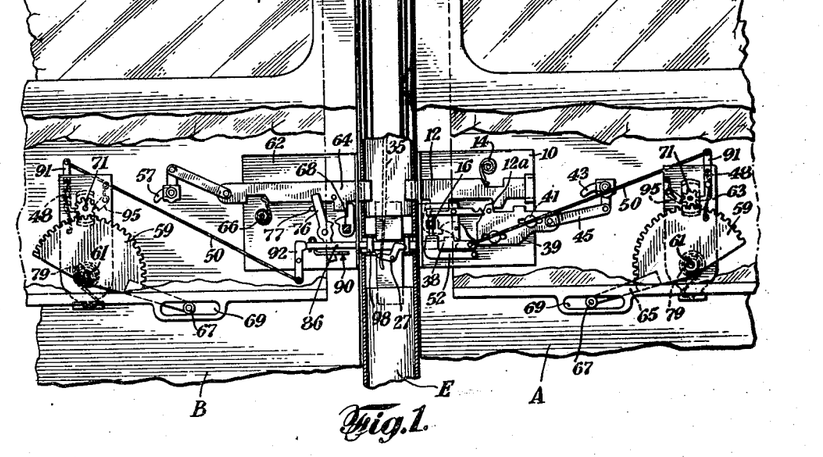
Fig. 1 is a fragmentary elevation of portions of the doors, windows and center post of an automobile on the master-door side thereof, some portions being broken away to reveal underlying structure and other portions being shown in section.
Figure 2:
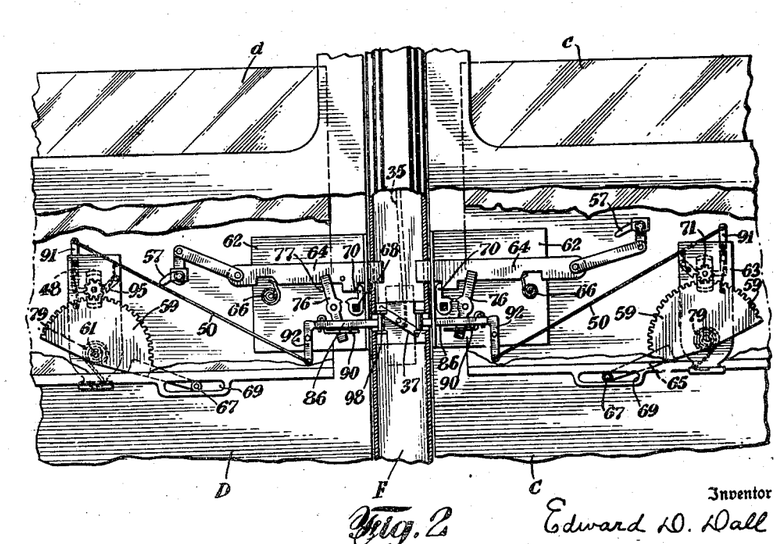
Fig. 2 is a view similar to Fig. 1 of the doors, etc., on the opposite side of the car.
Figure 6:
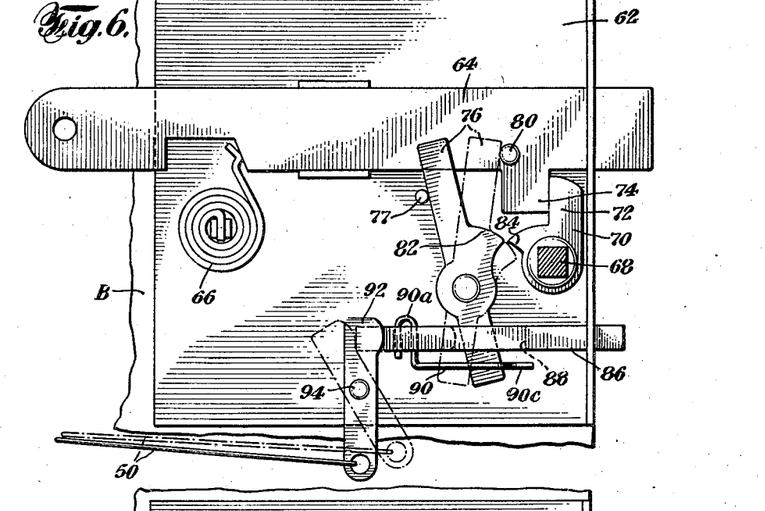
Fig. 6 is an enlarged view of the bolt means, retracting means and dogging means of one of the non-master doors.
Figure 15:
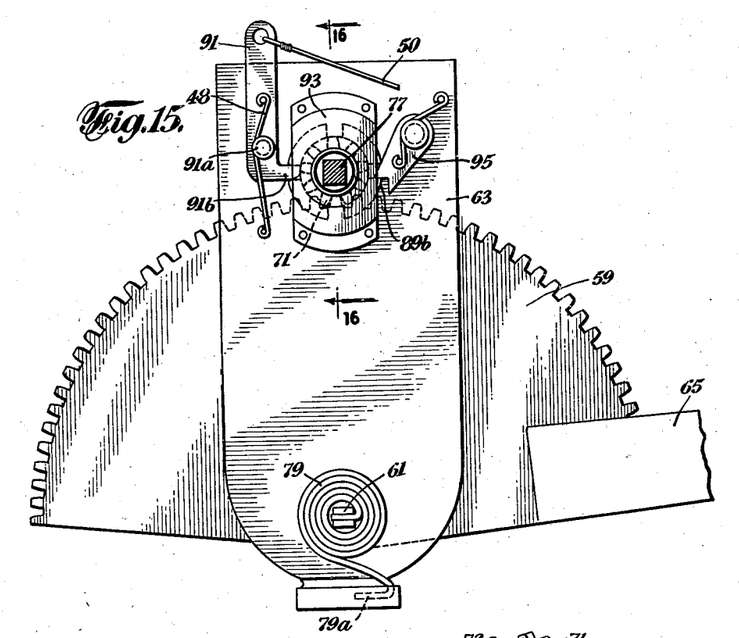
Fig. 15 is an enlarged view of one of the window operating mechanisms shown in Figs. 1 and 2.

Referring now to the bolt and the retractor dogging means for the non-master doors B, C and D, said means is or may be identical for said doors so that the following description of one suffices for all. Referring to Fig. 1 or 2 and the enlarged views 6 and 7, each bolt-means and retractor dogging-means for these non-master doors comprises a plate 62 for operatively supporting the parts; a bolt 64; a spring 66 for projecting the bolt; a shaft 68, Fig. 6, for an outside door handle; a roll back 70 with upward projection 72 to engage a lug 74 on the bolt for retracting the bolt by anti-clockwise rotation of the handle against the pressure of the above spring 66; a tiltable dog 76 pivoted at 78 to the plate having an upper end engageable at times by a pin 80 on the bolt as will be hereinafter explained; said dog further having a shoulder 82 receivable by the tilting of the dog into dotted line position, Fig. 6, under a lateral projection 84 of the roll back thereby preventing retraction of the bolt by the outside handle. A slide 86 is supported for endwise reciprocation below the bolt with one end projectable beyond the free edge of the door. It has a notch 88 (Fig. 8) receiving the lower end of the tiltable dog, whereby reciprocation of said slide and its associated spring clip operates the dog into and out of dogging position. The spring clip, designated as a whole by 90, has a part in this as an adjunct of the slide 86 but its construction and operation can be more opportunely described later on. The slide in its fully projected position shown in Fig. 6 tilts the dog into the full line non-dogging position shown. Reversely when in its inmost position, the clip ordinarily engages and tilts the dog into the dotted position, Fig. 6, wherein its shoulder 82 dogs the bolt retracting means by preventing rotation of the handle to retract the bolt. The slide is spring pressed into its outermost projecting position by the upper end of a lever 92 pivoted at 94 to the plate with its lower end pulled yieldingly to the left (Fig. 6) by spring means 48 (Figs. 1 and 2 etc., and Fig. 15) described later acting on wire 50 (Fig. 6). Thus when the bolt retracting means of the non-master doors are dogged so that said doors cannot be opened by their outside handles, the slides 86 of said non-master doors are "in" viz., are in their least projecting position. As distinguished from this, the slide 38 of the master door at such time (Fig. 4) is in its maximum projecting position as already described.

Figure 10:
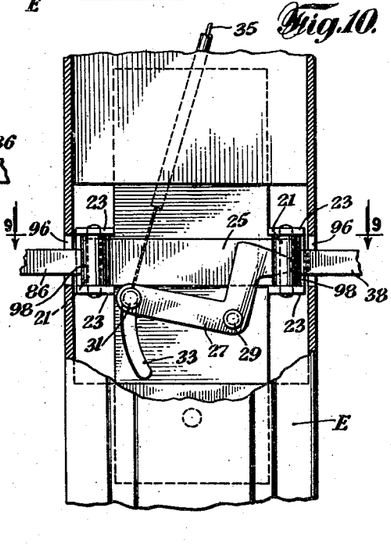
Fig. 10 is an enlarged broken away view of a portion of the center post in Fig. 1 and of the contained and related parts.
Figure 11:
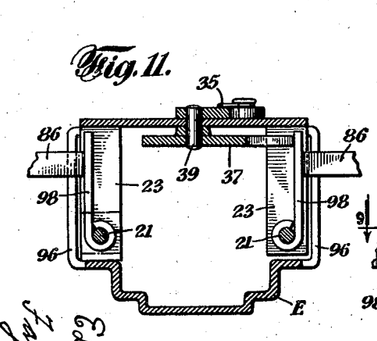
Fig. 11 is a horizontal section on the line 11—11 in Fig. 12.
Figure 12:
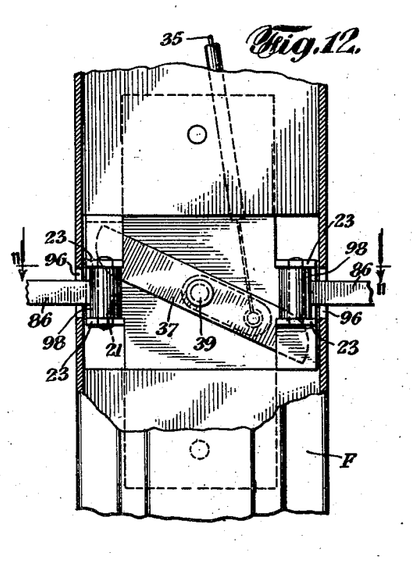
Fig. 12 is an enlarged broken away view of a portion of the center post in Fig. 2 and of the contained and related parts.

The center posts E and F of the automobile body are formed with horizontal slots 96 (Fig. 10 etc.) which receive and pass freely the projecting ends of the slides 38 and 86 so that they do not interfere with the opening and closing of the doors.

Figure 13:
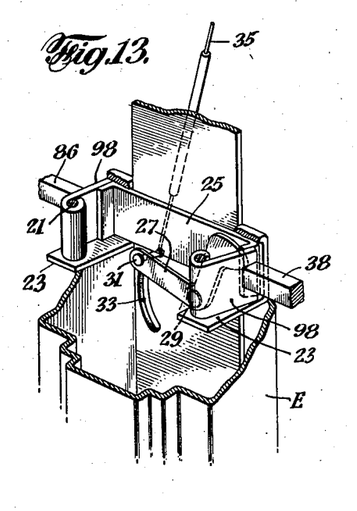
Figs. 13 and 14 are perspective views of the broken away center posts respectively and of the contained and related parts.
Figure 14:
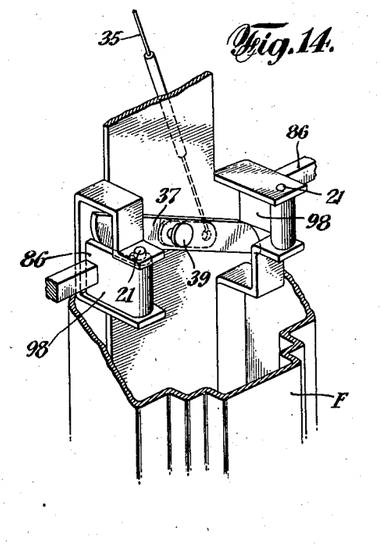

Means now to be described located within the post E delivers the outward thrust of the master door slide 38 (when same is projected to dog the bolt means of that door) directly across to the slide 86 of the door B to press same inwardly and thereby automatically dog as above explained the bolt means of said door B. This motion conveying means within the post E comprises hinged tablets 98 (best shown in the enlarged detail views Figs. 9–14) supported within the post adjacent the aforesaid slots 96. The tablets are hinged at their outer ends on vertical pins 21 supported on stationary brackets 23 so that the free ends of the tablets can swing towards and away from the slotted sides of the post. A thrust member, in this case a rigid strip 25 with right-angle ends, is suitably supported for horizontal reciprocation in contact at the ends with the tablets whereby the thrust of the master door slide 38 (Fig. 13) against its tablet is directly conveyed by the strip 25 to the other tablet and to the slide 86 of the other door B; and vice versa an outward thrust of the latter slide due to its spring means 48 (Fig. 1) is conveyed to the master-door slide.

Referring to the motion conveying means for operating the slides of the doors C and D on the other side of the car from the master-door, this means comprises the following: 27 is a bell crank lever pivoted at 29 within the post E (well shown in Fig. 10 or 13) with one arm at the tablet 98 at the master-door slide 38. Its other arm has a pin 31 projecting through an arcuate slot 33 in the back wall of said post. A Bowden wire 35 operatively connects this pin to a tilting cam lever 37 pivotally supported at 39 within the other post F (well shown in Fig. 12 or 14). The cam shaped ends of this lever are in operative engagement with the hinged tablets 98, which latter are in all respects similar to the previously described tablets having the same designating numeral in post E. The combination is such that the outward thrust of the master-door slide 38 operates the bell crank lever 27 to pull on the movable element of the Bowden wire 35 (which latter it will be understood is supposed to extend across the car either at the floor, or under the roof, or at or in the back of the front seats) which in turn tilts the cam lever 37 in the post F to swing the tablets therein simultaneously away from each other, that is to say, outwardly against the slides 86 with the result that said slides are pressed into their innermost position thereby dogging the bolt means of the doors C and D as already explained.

Reviewing now the operation as a whole of the devices so far described; the master-door A is locked as already explained in detail by using the key 22 (Fig. 19) and operating the master-door handle 18 and shaft 16 (Figs. 1, 3 and 4) counterclockwise. Incidentally, this projects the slide 38 of the master-door which through the described motion transferring devices in the center posts E and F including the connecting Bowden wire 35, automatically presses inwardly the slides 86 of all the other doors, thereby dogging their bolt retracting means and preventing the opening of said doors by their outside handles as heretofore explained. Vice versa, as soon as the key is turned to unlock the master-door, its spring means 48 (Fig. 1) as explained instantly retracts its slide 38 and undogs its bolt retracting means so that its handle and handle shaft 16 can be turned clockwise in Fig. 3 to unbolt said master-door. The retraction of the master-door slide 38 also automatically undogs the bolt means of all the other doors because then said master-door slide no longer prevents the outward movement of the slides 86 of the other doors, impelled as they are by their respective spring means 48 (Figs. 1 and 2), so that said slides now spring outwardly and thereby tilt the dogs 76 out of dogging position and release the bolt retracting means 70 of all these doors for operation by their outside handles on the shafts 68.

I also provide means whereby the doors are simultaneously lockable and unlockable from within the structure or vehicle body as follows: 39 (Figs. 1 and 3, etc.) is a slidable member supported and guided for horizontal reciprocation on pins 41 projecting from the master-door plate into horizontal slots in the slide. The usual hand lever 43 on the inside of the master-door is operatively connected by a link 45 with the slidable member whose front end is positioned to engage and push outwardly the slide 38 of the dogging mechanism of the master-door lock, when said inside handle is suitably operated. It will be seen that this not only dogs and locks the master-door from being opened from the outside, but will likewise automatically dog and lock the other doors due to the heretofore described action of the motion conveying devices in the posts and the Bowden wire and the resultant in-pressing of the slides 86 of said other doors.

47 is a latch (Figs. 3 and 4) centrally pivoted at 49 to a stationary support. The latch at one end overlies the key operated dog 20. A spring 51 yieldingly maintains the latch in contact with said dog. The opposite end of the latch is beveled and faces a pin 53 on the aforesaid slidable member 39. When said member is operated by the inside handle 43 as aforesaid to dog the bolts of all the doors, said pin 53 on said member pressing against the beveled end of said latch 47, tilts it downwardly until the pin is received into a notch 55 in the upper end of the latch. This occurs when the slidable member 39 has been moved far enough to dog the bolt means of the doors. Tampering with the master-door slide 38 to unlock the doors from the outside is prevented by the described latch. On the other hand, it does not interfere with the unlocking of all the doors simultaneously from within the car by operating the inside handle 43 of the master-door to retract the slidable member 39 because the pin 53 of the latter merely rides out of the notch 55 by camming the notched end of the latch downwardly. Also the latch 47 can be released from the member 39 from the outside of the car by turning the key in the master-door lock to elevate the dog 20 as in Fig. 3, which it will be seen from that figure tilts the aforesaid latch 47 so as to release the slidable member 39 whereupon the spring-tensioned wire 50 operates the master-door slide 38 to undog the master-door and simultaneously permits the operation of the slides 86 of the other doors to undog their bolt retractor 70.

Moreover, each of the other doors B, C and D is provided with an inside handle lever 57 (Figs. 1 and 2) linked to its bolt 64 which is always operable by an occupant of the car to retract the bolt of the particular door to permit opening the door from within the car, despite the fact that all of the doors may have been previously locked against being opened from the outside, whether by the key and outside handle means of the master-door, or by the inside handle 57 of said door. The advantage will be appreciated of being able to lock oneself in a parked car without being disturbed by anyone opening the doors from the outside, or stealing articles from the car.

Figures 7, 8:
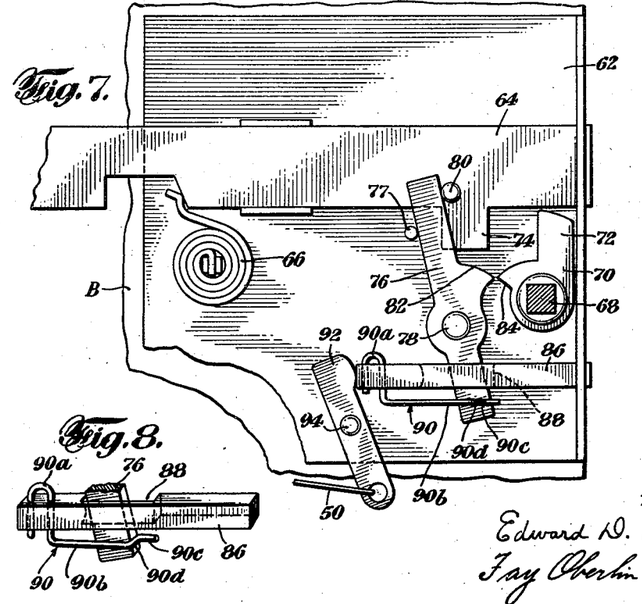
Fig. 7 is the same as Fig. 6 except that it shows the parts in a different position.
Fig. 8 is a perspective view of a portion of Fig. 6.
Figure 9:
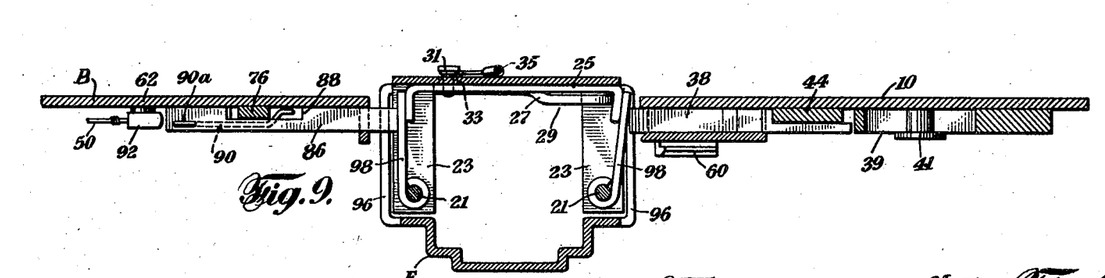
Fig. 9 is a horizontal sectional view on an enlarged scale through a portion of the devices in Fig. 1, or on the line 9—9 in Fig. 10.

In case an occupant of the locked car opens one of the non-master-doors B, C or D by operating its inside handle 57 and then steps out of the car and shuts the door, this without further mechanism would result in locking said person out of the car, because on shutting the door, its slide 86 would ride against its tablet 98 and would be forced back again into its innermost position wherein it tilts its dog 76 into dogging position as shown by the dotted lines in Fig. 6. To prevent this contingency is the object of providing the heretofore referred to so-called spring clip having the general designation 90 on each of the slides 86. This clip is well shown in Fig. 8 and consists of a piece of spring wire having a U-shaped end 90a threaded through parallel holes in the slide for attaching the wire clip thereto. Further, said clip has a free end 90b which generally parallels the slide longitudinally but is bent at its extremity to form a toe-portion 90c which is located nearer the axis of the slide and which is connected by a slightly inclined portion 90d with the main part 90b of the clip. The interrelation of the parts is such that they operate as follows: Assuming that the non-master-door, which has been automatically locked against opening from the outside, is the one indicated in Fig. 6, and that therefore, its tilting dog 76 is in the dotted position against the pin 80 of the extended door bolt, should now the assumed contingency occur of the occupant retracting the bolt by its inside handle 57 (Fig. 1 or 2), said pin 80 (Fig. 6) on said bolt would tilt the dog 76 out of dogging position and would cause the lower end of the dog to ride partly past and under the toe-portion 90c (Fig. 8) of the spring clip on the slide and would cause same to be frictionally held thereby as shown in Fig. 7. The result is that even if the person alights from the car and unthinkingly shuts the door, the dog will be held by the spring clip and will be prevented from returning into the dotted line dogging-position shown in Fig. 6, and therefore the door can be re-opened from the outside.

On the other hand, the clip 90 will be automatically released from the aforesaid position shown in Fig. 7 and will be restored to its normal working position as soon as the spring pressed slide 86 is released, as by unlocking the master-door, because then said slide will carry the clip to the right in Fig. 7 off the dog 76 which at such time is prevented from swinging about its pivot 78 by the stop pin 77 supported by the plate 62.

I will now describe the means whereby any and all windows of the doors if open will be automatically closed by the locking of the master-door, whether this be done from the outside of the car or from within.

Figures 16, 17, 18:
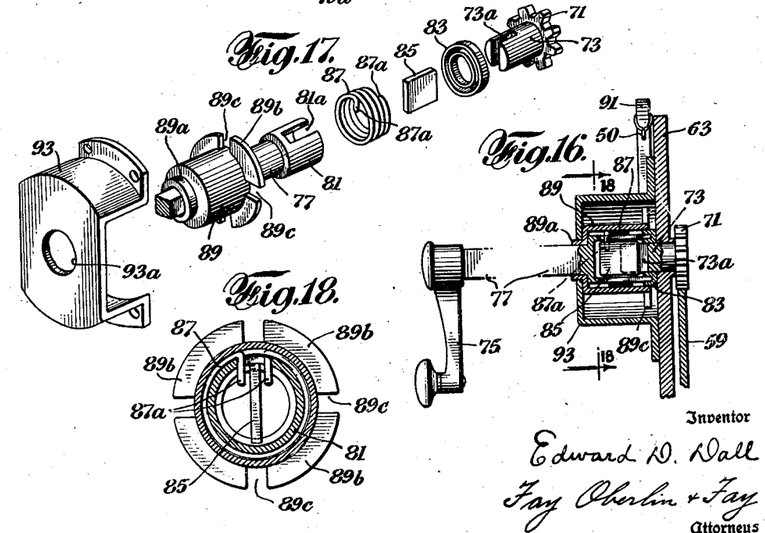
Fig. 16 is a combined vertical section and elevation on the line 16—16 in Fig. 15.
Fig. 17 is a perspective view of parts from Fig. 15 or 16 in spaced apart order.
Fig. 18 is a cross sectional view on the line 18—18 in Fig. 16.

In the first place, each door is shown equipped with the usual vertically slidable glass window a, b, c or d as a closure for the usual opening in the upper part of the doors. Also, a well known form of means for raising and lowering the windows individually is provided on each door but with important modifications for the purposes of this invention. This well known means comprises the following: 59 is a gear toothed sector having a shaft 61 supported in suitable bearings not shown in the stationary plate 63 or other suitable support or housing on the door as indicated in Figs. 1, 2, etc. A radial arm 65 rigid with the sector has a pin 67 (which may be surrounded by a rotatable sleeve to reduce friction) located within a horizontal slot 69 formed in the frame at the bottom of the window. 71 is a pinion on a short slotted shaft 73 (Figs. 16 and 17) operatively supported for rotation by stationary plate 63 in a suitable bearing as indicated in Fig. 18. A handle 75 on handle-shaft 77 is indirectly connected with the aforesaid pinion shaft 73 and is exposed on the inside of the car for manually turning the pinion 71 and the sector 59 in either direction in order to raise or lower the window as desired by the action of the aforesaid sector arm 65 on the lower edge of the window. A coiled spring 79 has its inner end secured to the shaft 61, Fig. 15, of the sector and is coiled under tension about said shaft with its outer end 79a secured to the stationary plate or housing 63 so that the tendency of said spring to unwind tends to rotate the sector and its arm in opposition to the pinion to counterbalance the weight of the window. The foregoing is the function and strength given to this spring 79 in the ordinary device but for the purpose of this invention I make it much stronger so that each spring will operate to close its window whenever released and permitted to do so, as will later appear.

The operative connecting means between the handle and pinion shafts 77 and 73 comprise the following: The free end of the handle shaft consists of a sleeve or cup 81 formed with a slot 81a through its wall. 83 is an annularly channeled washer surrounding the pinion shaft at the opposite face of the stationary support 63 from the pinion 71, as shown in Fig. 16. When the parts thus far described are assembled as shown in Fig. 16, it will be seen that the handle shaft sleeve 81 encloses the slotted pinion shaft 73 and that the rim or mouth of said sleeve is seated in the channel of said washer 83. 85 is a small rectangular plate or piece located across the inside of the handle shaft sleeve 81 with one end in the slot 73a of the pinion shaft. A helical spring 87 surrounds the handle shaft sleeve and has inwardly directed ends 87a projecting through the slot 81a in said sleeve far enough, when rotated with the sleeve, to engage against the sides of the rectangular piece 85. A cylindrical casing 89 surrounds the entire assembly so that its inside wall is frictionally gripped by said helical spring 87 when it is in its relaxed and expanded state, but not when the coils of the spring are tightened up. This casing has a reduced neck 89a forming within it a bearing for the rotation of the handle shaft 77. In the ordinary construction, this casing 89 is always non-rotary and is secured by its base to the stationary supporting plate 63. The operation of the aforesaid ordinary form of the device is as follows: When the device is not being operated the helical spring 87 is relaxed and then frictionally grips the inside of the stationary casing 89 thereby causing the device, assisted by the other spring 79, to support the weight of the window in any given position. As soon as the handle 75 is rotated in either direction, the helical spring 87 is wound up more tightly by the advancing side of the slot 81a carrying with it the adjacent end 87a of the spring so that said spring no longer grips the inside of the stationary casing 89. After that, the same projecting end 87a of the spring, engaging the side of the rectangular plate 85, carries it around with the sleeve 81, and said plate being located in the slot 73a of the pinion shaft causes said shaft and its pinion 71 to rotate to drive the toothed sector 59 to raise or lower the window depending on the direction of rotation of the pinion 71 and handle 75.

To the foregoing I add the following, besides strengthening the spring 79 as already stated: Instead of securing the casing 89 non-rotatably to the fixed plate 63, I provide it with a flange 89b having radial notches 89c. Further, I provide a lever 91 (Figs. 1, 2, 15 etc.) pivoted at 91a to the stationary plate 63 with a lateral projection or detent 91b on its lower end adapted to enter any one of the aforesaid radial notches 89c and thereby hold the aforesaid casing 89 releasably stationary. A spring 48 surrounds the pivot pin with its ends tensioned and fastened respectively to the fixed support 63 and the upper part of the detent lever 91 whereby said spring normally presses the detent into engagement with the notched rim 89b of the casing 89 thereby preventing it from rotating. An arch-shaped casing 93 (Figs. 16 and 17) is affixed by its base to the stationary plate. The neck 89a of the other casing 89 has its bearing in a hole 93a (Fig. 17) in the cross piece of the arch shaped casing. A tie-wire 50 (Figs. 1, 2, etc., 15) connects the upper end of the detent lever 91 with the slide 38 of the master-door dogging means; or in the case of the other doors connects with the lower end of a centrally pivoted lever 92 (Figs. 1 and 2) with its upper end engaging the rear end of the dog operating slide 86.

The operation of my aforesaid modifications of the usual device is as follows: As long as the casing 89 is locked stationary by its detent lever 91 my device operates like the ordinary device, in that it permits raising and lowering of the window by hand, and the window will be frictionally held at the selected level by the frictional grip of the expanded helical spring 87. On the other hand, as soon as the doors are automatically locked from the locking of the master-door, the operation of the slides 38 and 86 of the dogging mechanism pulls on all the wires 50 and tilts all of the spring pressed detent levers 91 out of engagement with all of the casings 89 (Figs. 15 to 18) which then become free to rotate with the handle and pinion shafts and intermediate parts. Since there is now nothing to prevent the rotation of the pinions 71 and toothed sectors 59, all of the springs 79 immediately assert themselves by rotating all of the sectors to close completely all of the windows.

Reversely as soon as the master-door is unlocked, all of the aforesaid slides 38 and 86 are restored to their normal position by the springs 48, and the pull on the wires 50 having been relaxed, the springs 48 again cause the detent levers 91 to engage the notched flange of the casings 89, so that the window operating devices again become individually operable from the handles 75.

A spring pressed pawl 95 continuously engages the notched flange 89b of each rotatable casing 89 preventing rotation of the casing and the other parts in window opening direction but not in closing direction. This last named feature prevents the closed windows from being forced down from the outside of the car.

Referring back to the description of the slidable member 38 on the master-door A, it might have been there stated that another function of said slide is of course to enable the master-door A to be unbolted at any time from within the car. Thus, by depressing the inside handle 43, Fig. 3, the lug 38a on the slide engaging the lug 12a on the bolt will cause the bolt to be retracted and permit the master-door to be opened.

Figure 20:
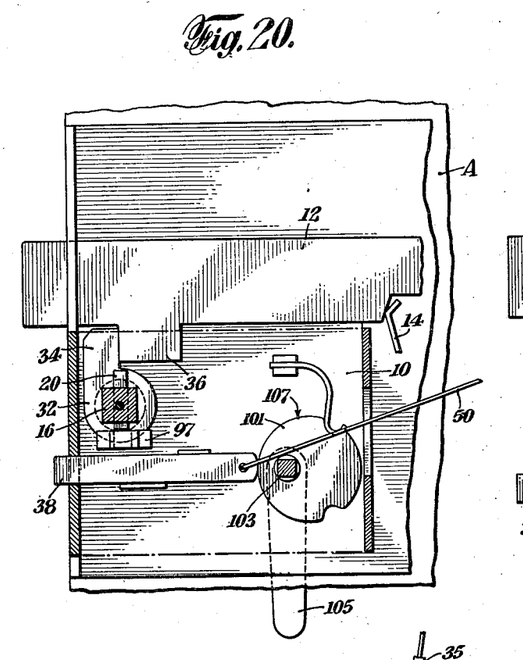
Fig. 20 shows a modification substitutable for the master-door dogging means and slide-operating means in Fig. 1.

Fig. 20 shows a modification wherein the master-door slide and its operating means are divorced from the outside door handle. In this figure, the spring-pressed bolt 38 is adapted to be retracted by turning the door handle shaft 16 and roll back 32 clockwise, but the shaft is lockable against such rotation by key operation of its slidable dog 20 to seat its lower end in the stationary socket 97 on the plate 10 of the lock. The slide 38 is retractable by the spring-tensioned wire 50 like the corresponding slide in Fig. 1, and reversely may be pushed forward by the cam 101 on the shaft 103 rotatable by the handle 105 on the inside of the master-door. Spring detent 107 releasably engages notches on the cam at its active and inactive positions.

Assuming the devices in Fig. 20 to be substituted for the corresponding devices on the master-door in Fig. 1, it will be understood that by operating the handle 105, the high part of the cam can be made to force the slide 38 into its outermost position. Ordinarily this will be done when the master-door is open. If so, upon closing said door, the projecting end of the aforesaid slide 38 entering the related slot in the post E (compare Figs. 9 and 10) will force the adjacent tablet 98 inwardly and, through the intermediate devices, will operate the other tablets 98 as heretofore described to operate the slides 86 of the other doors to dog their bolts. Similarly this will result in closing the windows of said doors. Finally, the master-door itself may be locked by turning the key to seat the dog 20 (Fig. 20) in the socket 97.

Figure 21:
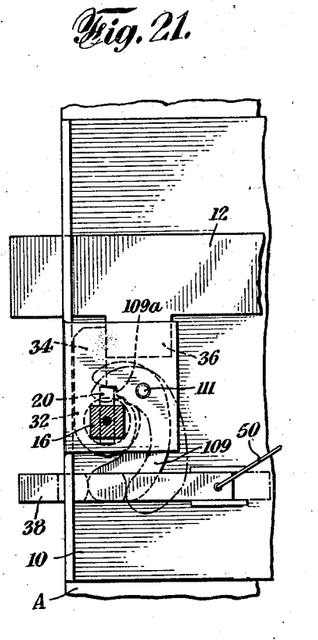
Fig. 21 shows another modification similarly substitutable in Fig. 1.

Fig. 21 shows another modification which, like the modification in Fig. 20, is substitutable on the master-door in Fig. 1. As heretofore, the same or analogous parts have been given the same numerals to economize description. The novel part in Fig. 21 is the cam-lever 109 pivoted at 111 to the plate 10. When the dog 20 is key-operated into its up position as shown in this Fig. 21, it bears against the upper end of the cam lever, so that the lower end of the lever (contained within the forked rear-end of the slide 38) pushes the slide into its outermost position. The cam lever 109 in this position simultaneously dogs the roll-back 32 so that it cannot be rotated clockwise to retract the spring pressed bolt 12 due to the fact that the abutment 109a of the cam lever is then interposed between the side of the dog 20 and the pivot 111 of the lever.

Ordinarily, the described position of the parts as in Fig. 21 will be accomplished by turning the key in the master-door while open. Then upon closing the door, the spring pressed bolt 12, after riding to the right against its spring, will then spring outwardly into its socket in the adjacent post, whence it cannot be retracted by turning the door handle except by using the key to lower the dog 20. Also, the slide 38, as the door closes, will pass into the slot 96 (compare Figs. 9 and 10) and push inwardly the related tablet 98 and through same and the other devices, as already explained, will automatically dog the bolt retracting means of the other doors.

It will be noted that the form of the invention shown in Fig. 21 differs in that the master-door slide 38 is operated into its dogging position by the key that operates the dog 20, instead of as in the other forms by the turning of the master-door handle and its shaft 16, or by turning the cam in Fig. 20.

Figure 22:
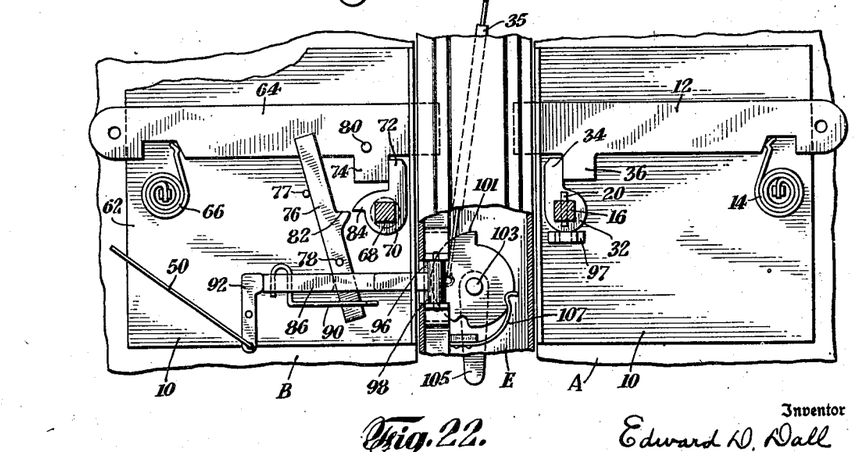
Fig. 22 shows still another modification substitutable in Fig. 1 for the dogging means and slide-operating means.

Fig. 22 shows another modified construction for use in connection with the doors A and B and the post E as a substitute for the construction shown in Fig. 1. The same or analogous parts in the two figures have been designated by the same numerals so as to save description. The construction in Fig. 22 also compares with that in Fig. 20, and the same or analogous parts in common have been designated by the same numerals. The difference between the constructions in Figs. 20 and 22 is that in Fig. 22, the cam 101 has been removed from the master-door to within the center post E, where it acts directly on the slide 86 of the door B through the intervening swinging tablet 98. The handle is of course on the inside of the car on the free end of the cam shaft 103 which projects through the wall of the center post E. The Bowden wire 35 operatively connects the cam 101 to the tilting cam lever 37 in the center post F on the opposite side of the car to operate the tablets 98 and the dogging slides 86 on that side of the car, as already described in connection with the construction shown in Figs. 1 and 2.

Thus, the construction in Fig. 22 used in connection with the construction in Fig. 2 enables the simultaneous locking of the non-master doors B, C and D and the automatic closing of their windows from the single control 105 within the car. As to the master-door, this is locked by using the key to seat the dog 20 in the stationary socket 97, thereby preventing the operation of the roll-back 32 to retract the bolt 12.

It will be understood that the expression "locking means" herein includes any means for dogging the bolt retracting means and may or may not include key-controlled or key actuated means. This application is a division of my co-pending application Serial No. 655,180, filed February 4, 1933.

What I claim is:—

1. The combination with an automobile body and the like, its doors, and windows in said doors, of locking means for a master-door; locking means for another door associated with and responsive to the operation of the master-door locking means; and window operating means within each door associated with and responsive to the operation of the locking means of such door.

2. The combination with an automobile body and the like, its door, and windows in said doors, of means for simultaneously locking a plurality of said doors; and window closing means within each door associated with and responsive to the operation of said locking means of such door whereby the locking of the doors is operative to close the windows.

3. The combination with an automobile body and the like, its doors and windows, of means for simultaneously locking a plurality of said doors; a normally restrained automatic closing device for each window; and means for releasing said automatic window closing devices associated with and responsive to the operation of the door locking means whereby locking the doors releases and permits the window closing devices to operate.

4. In combination with a door and a window therein of locking means for said door; and window operating means within said door associated with and responsive to the operation of the door locking means whereby the locking of the door is operative to close said window.

5. In combination with a door and a window therein, of locking means for said door; a normally restrained, automatic closing device within said door for said window; and means for releasing said automatic window closing device associated with and responsive to the operation of the door locking means whereby locking the door is operative to close the window.

6. In combination with a door and window; of locking means for said door; a normally restrained, automatic closing device for said window, said device when restrained permitting the window to be operated manually; means for operating the window manually, and means for releasing said automatic window closing device associated with and responsive to the operation of the door locking means whereby locking the door is operative to close the window.

7. The combination with an automobile body, or the like, a door and window, and locking means for said door, of means for manually raising and lowering said window comprising gearing, a handle-operated member for operating said gearing in either direction, a helical spring associated therewith so as to be coiled more tightly and contracted in diameter during the operation of said means in either direction; a rotatable casing surrounding said spring which latter in its relaxed state forms a frictional brake against the inside of the casing; means normally operative to hold said casing against rotation and which is associated with and responsive to the door-locking means, whereby said casing is freed for rotation by the locking of said door; and means which biases said window so as to be self-closing when said casing is free.

8. The combination with an automobile body or the like, a door and window, and a lock for said door; of handle operated means for raising and lowering the window; a rotatable support, adapted to be held stationary, for the handle operated means; means operative between said handle-operated means and said support normally operative to prevent relative rotation therebetween, but which is released by operation of the handle-operated means; means normally operative to hold the rotatable support against rotation, said means being associated with and responsive to the door lock, whereby said support is freed for rotation by the locking of said lock; and means which biases the window so as to be self-closing when said support is free.

9. In combination with a door and window, and locking means for said door; of manual means for operating said window comprising a rotatable part adapted to be held stationary, the operation of said manual means depending on said part being stationary; means for automatically closing said window associated with the aforesaid rotatable part and operable when it is free to rotate; releasable means for holding said part stationary associated with and responsive to the door locking means whereby locking the door is operative to release said means.

10. In combination with a door and window, and locking means for said doors; manual means for operating said window comprising a rotatable part adapted to be held stationary, the operation of said manual means depending on said part being stationary; means for automatically closing said window associated with the aforesaid rotatable part and operable when it is free to rotate; releasable means for holding said part stationary associated with and responsive to the door locking means whereby locking the door is operative to release said means; and means associated with said rotatable part which allows it to rotate in direction to permit the window to be closed but not reversely.

11. In combination with an automobile body and the like, a master-door; bolt means for said master-door, means for retracting said bolt means, means for dogging said retracting means including a movable member at the vertical free edge of said door; another door or doors; bolt means for said other door, retracting means for its said bolt means, and means for dogging said retracting means including a movable part at the vertical free edge of said other door or doors whereby its dogging means is operable; and mechanical means operative between the aforesaid master-door member and the aforesaid part on the other door or doors whereby the bolt dogging motion of the member operates the part; windows in said doors; a normally restrained, automatic closing device for each window; and means for releasing said automatic window closing devices which last named means are responsive to the dogging movement of the aforesaid member and part.

12. In an automobile body of the sedan type, a window, a handle adapted to operate same, means normally held locked against operation adapted to raise said window; a door and means for locking same; and means whereby operation of said door-locking means releases the said means adapted to raise said window, which last specified means includes a movable element located adjacent an opening in a vertical edge of said door.

13. In a window operating mechanism, manually operable means for cranking said window open and closed, energy storing means actuated by opening movement of the window for subsequently closing it, means for locking said window when closed by said second mentioned means, and means actuated by said manual means for releasing said locking means.

14. A control system for doors and windows comprising means for closing said windows and means for locking said doors, one of said doors having a mechanical key lock, and means actuated by operation of said lock for operating said window closing and door locking mechanism.

15. The combination, in a vehicle body having a plurality of movable window panes and a door provided with a key controlled lock, of power mechanism for raising said panes, and means associated with said lock and power means to automatically raise the panes upon the locking of the door.

16. The combination, in a vehicle body, of a window pane adapted to be raised and lowered, and a door having a key controlled lock, of power means responsive to the locking of the door to raise automatically the window pane.

17. In an automobile body having a door and a window, an oscillatable segment having an operative connection with said window for opening and closing the same when said segment is oscillated in opposite directions, spring means operatively connected with said segment for loading when said segment is oscillated in window opening direction, said spring means when loaded being operable to close said window, manual means for oscillating said segment in window opening direction, a pawl normally locking said manual means to hold said window in open position, means for locking said door, and means controlled by said door locking means for releasing said pawl.

18. In an automobile body of the sedan type, a window, mechanism for opening and closing said window, means for closing said window, said last named means being held locked against operation when said window is open, a door and means for locking the same, and means whereby operation of said door locking means releases said window closing means.

19. In a window structure, manually operable means including means for cranking said window open and closed, and means energized by opening movement of the window for automatically closing it.

20. In a window regulator, manually operable means for opening and closing said window, means for locking said window in any position, means for releasing said locking means by said manual means, and means energized by opening movement of the window for automatically closing it including means for holding said automatic means against closing movement and means for releasing said holding means.

21. The combination with an automobile body having a plurality of doors and windows, of means for holding said doors closed, means for releasing said holding means, window closers for said windows, and means responsive to movement of one of said releasing means for causing movement of said window closers.

22. The combination with an automobile body having a door and a window, of means for holding said door closed, means for releasing said holding means, a closer for said window, and means responsive to movement of said releasing means for causing movement of said window closer.

23. In combination with an automobile body having a door, said door having a free edge, a window in said door, means for closing said window, and control means for said window closing means including movable parts operable through the free edge of said door and coacting movable parts on said body.

24. The combination with an automobile body having a door, of a window in said door, means for automatically closing said window, and means including a train of movable parts extending through an edge of said door and arranged to transmit movement of said parts for controlling said automatic closing means.

25. In combination with an automobile body having a plurality of doors, each door having a window therein, means for automatically closing each window, and means including movable parts operable through an edge of each door and coacting motion transmitting movable parts on said body extending to a controller remote from said doors and adapted upon operation to automatically close all of said windows.

26. In a structure provided with a plurality of windows, means including a regulator within the structure for independently opening and closing each of said windows, and a continuous train of operably associated movable parts connected at one end with said means at each window and at its other end with a master control operated from outside the structure coacting with said means to simultaneously close all open windows.

27. The structure defined in claim 26 in which doors are provided for said structure, and means for independently locking each of said doors, said master control interconnecting with the door lock means for actuating the latter concomitantly with said simultaneous window closing.

28. In a structure provided with a plurality of windows, means within the structure for independently opening and closing each of said windows, and a continuous train of operably associated movable parts connected at one end with said means at each window and at its other end with master controls on the exterior and interior of the structure any one of which when made effective coacts with said means to simultaneously close all open windows.

29. In combination with an automobile body having doors on opposite sides thereof, windows in said doors, automatic closing means on a door for closing its window, and control means for said automatic closing means including a train of operably associated movable parts associated with said closing means on a door on one side of said body and extending onto a door on the opposite side of said body and there provided with an actuator.

30. In combination with an automobile body having a pair of doors side by side, a post between said doors, windows in said doors, automatic closing means on at least one of said doors for closing its window, and control means for said automatic closing means including a train of operably associated movable parts associated with said closing means on one door and operable through the post to the other door and there provided with an actuator.

EDWARD D. DALL.